US012022269B2

(12) United States Patent
Jackson et al.

(10) Patent No.: US 12,022,269 B2
(45) Date of Patent: Jun. 25, 2024

(54) PORTABLE SPEAKER WITH AUTOMATIC DETECTING INPUT CHANNEL

(71) Applicant: Bose Corporation, Framingham, MA (US)

(72) Inventors: Craig Jackson, Waltham, MA (US); Thomas Daly, Northborough, MA (US); David Ostrer, Uxbridge, MA (US); Jayesh Dilip Sarode, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/583,527

(22) Filed: Jan. 25, 2022

(65) Prior Publication Data

US 2023/0239620 A1 Jul. 27, 2023

(51) Int. Cl.
*H04R 3/12* (2006.01)

(52) U.S. Cl.
CPC ........... *H04R 3/12* (2013.01); *H04R 2420/01* (2013.01); *H04R 2420/07* (2013.01)

(58) Field of Classification Search
None
See application file for complete search history.

(56) References Cited

U.S. PATENT DOCUMENTS 7,678,985 B2 * 3/2010 Adams .................. G10H 3/186 361/728
10,306,386 B2 5/2019 Warden et al.
10,524,042 B2 12/2019 Brousseau et al.
10,555,101 B2 2/2020 Warden et al.
2006/0083259 A1 * 4/2006 Metcalf ................ H04L 12/403 370/466
2010/0272270 A1 10/2010 Chaikin et al.
2013/0156236 A1 6/2013 Hayashi
2013/0244734 A1 9/2013 Latham et al.
2013/0273966 A1 10/2013 Griffin
(Continued)

FOREIGN PATENT DOCUMENTS

CN 103997704 A 8/2014
CN 211702287 U 10/2020

OTHER PUBLICATIONS

Bose-S1-Pro, Owners Guide, Apr. 2018, 19 pages.
(Continued)

*Primary Examiner* — Paul W Huber
(74) *Attorney, Agent, or Firm* — Hoffman Warnick LLC

(57) ABSTRACT

Various implementations include portable speakers configured to adjust audio output based on detected input connections. In certain cases, a portable speaker includes: an enclosure housing: at least one electro-acoustic transducer for providing an audio output; a processor coupled with the transducer; an audio input module coupled with the processor for receiving audio input signals; and a battery configured to power the at least one transducer, the processor, and the audio input module; an input channel for receiving a hard-wired audio input connection; and at least one wireless input channel for receiving an audio input from a source device via a wireless connection, where the processor is configured to: adjust an audio signal received from the hard-wired audio input connection if a source device is already connected via the wireless connection.

20 Claims, 13 Drawing Sheets

(56) References Cited

U.S. PATENT DOCUMENTS

| | | | | |
|---|---|---|---|---|
| 2013/0291708 | A1* | 11/2013 | Orshan | G10H 1/0091 84/626 |
| 2014/0083278 | A1 | 3/2014 | Dietz | |
| 2015/0178038 | A1 | 6/2015 | Yliaho | |
| 2016/0112787 | A1* | 4/2016 | Rich | H04R 1/10 381/384 |
| 2018/0206026 | A1 | 7/2018 | Notzel | |
| 2020/0151646 | A1* | 5/2020 | De La Fuente Sanchez | G06Q 10/06398 |
| 2021/0368269 | A1* | 11/2021 | Bounamin Sylla | G06F 3/165 |
| 2023/0007397 | A1* | 1/2023 | Delhoume | H04R 27/00 |

OTHER PUBLICATIONS

PCT International Search Report and Written Opinion for International Application No. PCT/US2023/011141, dated Jul. 7, 2023, 21 pages.

PCT International Search Report and Written Opinion for International Application No. PCT/US2023/011134, dated Sep. 1, 2023, 19 pages.

* cited by examiner

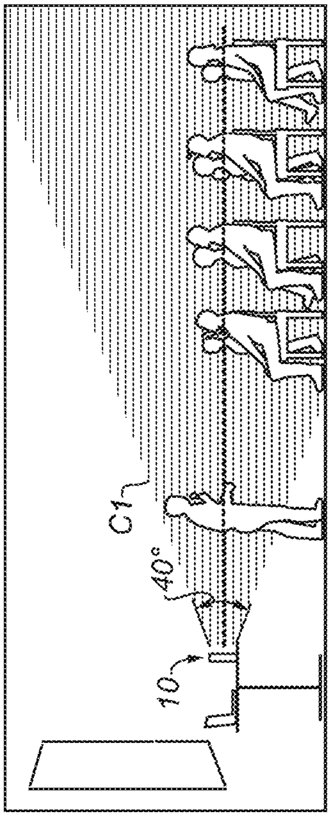
FIG. 2A(1)
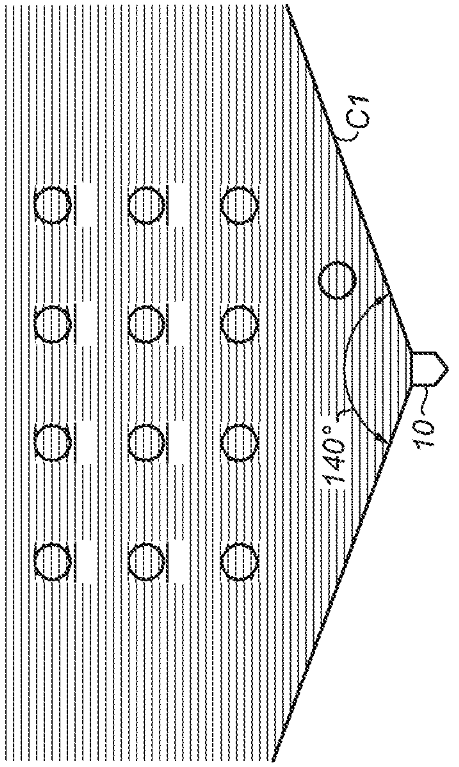
FIG. 2A(2)
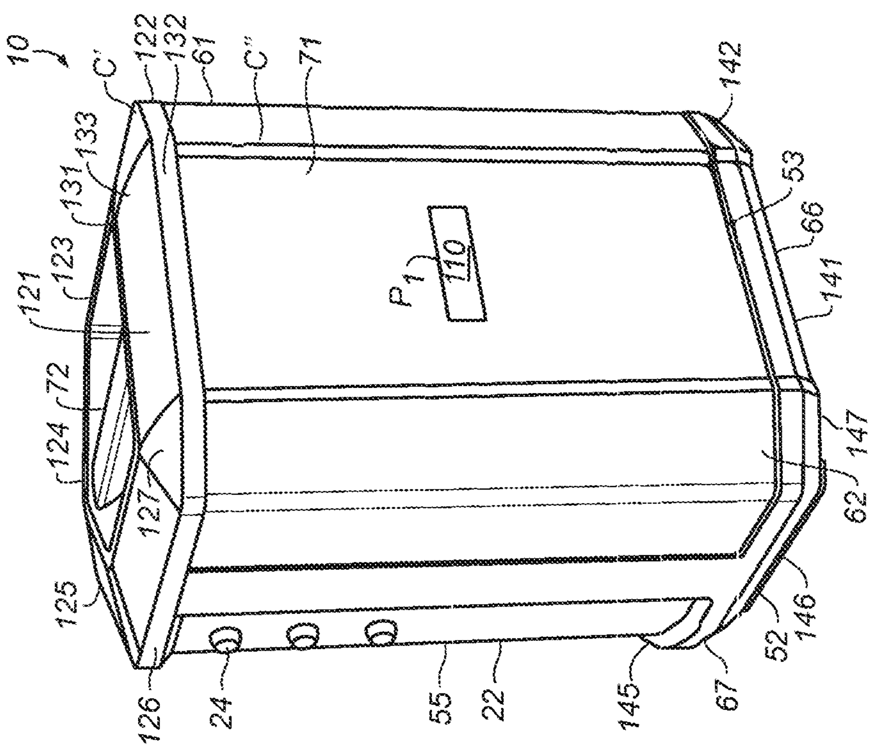
FIG. 1A

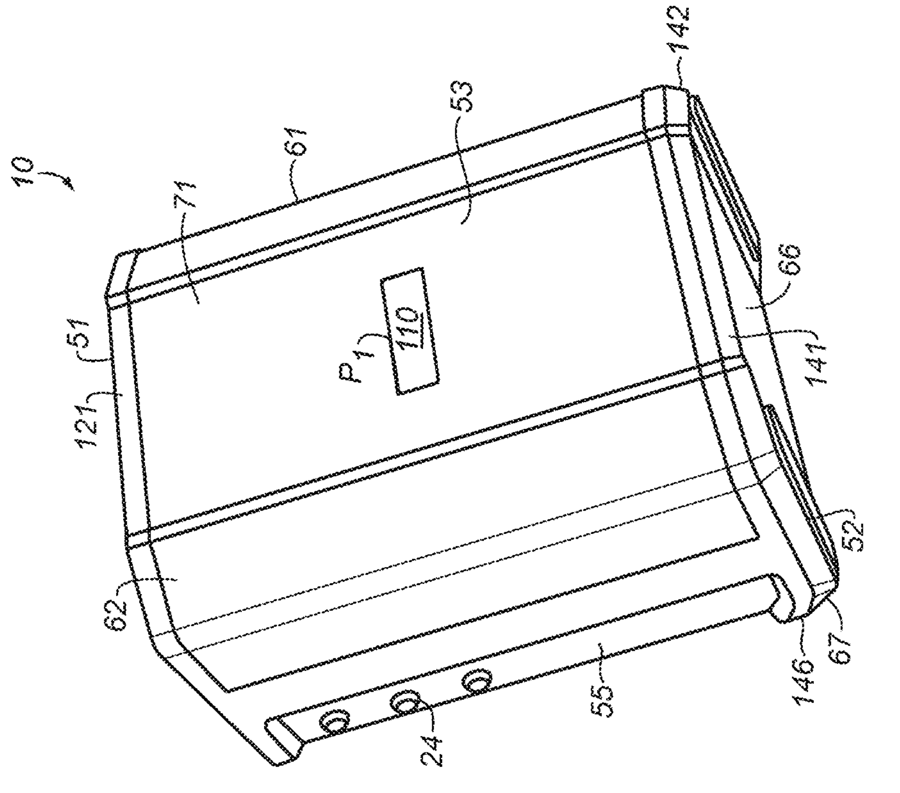
FIG. 1B
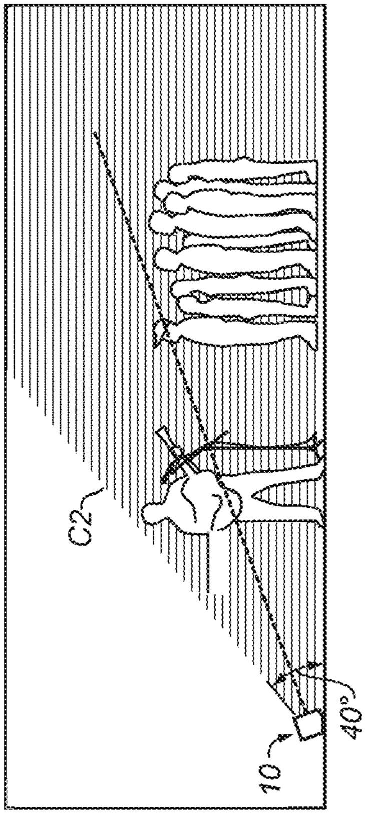
FIG. 2B(1)
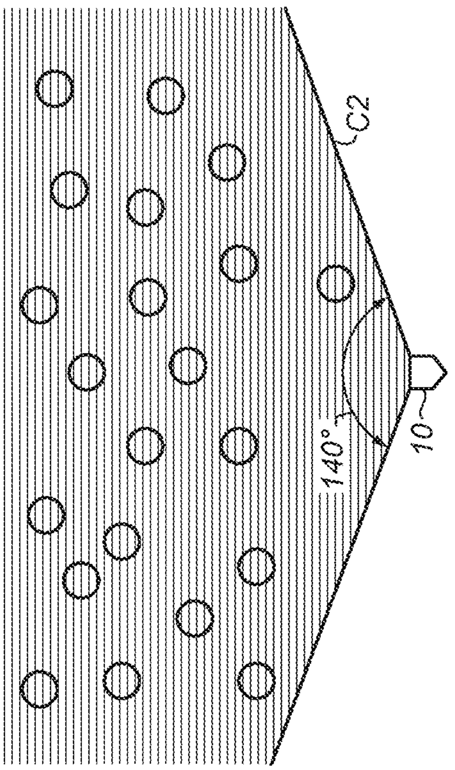
FIG. 2B(2)

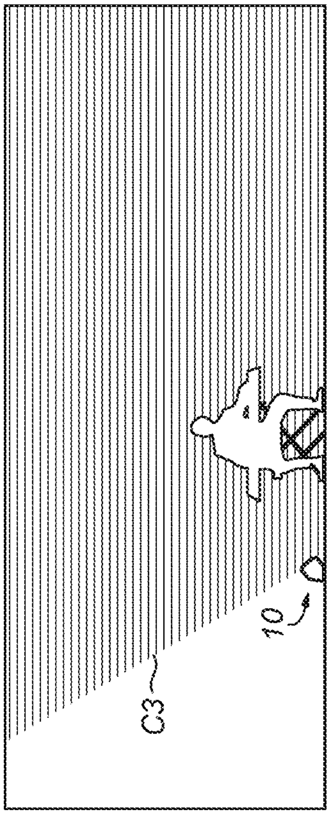
FIG. 2C(1)
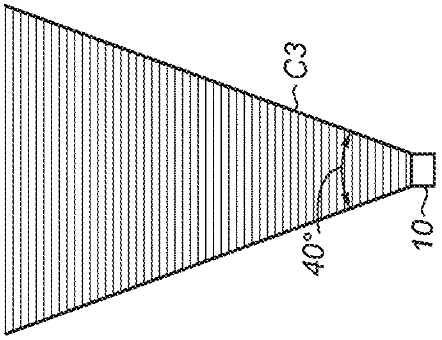
FIG. 2C(2)
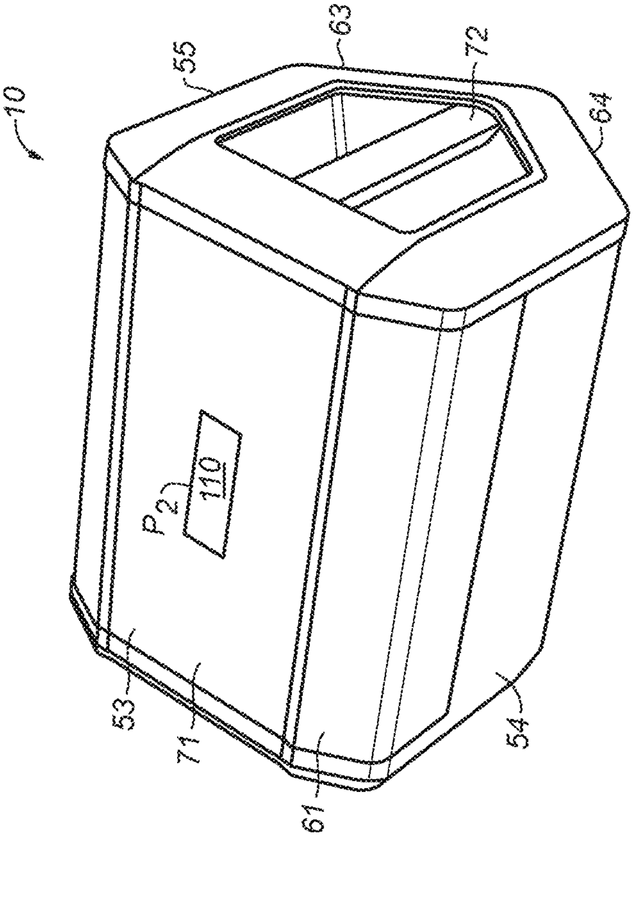
FIG. 1C

PORTABLE SPEAKER WITH AUTOMATIC DETECTING INPUT CHANNEL

CROSS-REFERENCE TO RELATED APPLICATIONS

This application relates to co-pending U.S. patent application Ser. No. 17/583,524, filed on Jan. 25, 2022 and U.S. patent application Ser. No. 17/583,529, filed on Jan. 25, 2022, the entire disclosures of each of which are incorporated by reference.

TECHNICAL FIELD

This disclosure generally relates to portable speakers. More particularly, the disclosure relates to portable speakers such as portable public address (PA) speakers with wireless transmitters.

BACKGROUND

Portable loudspeakers, such as portable PA systems, can provide flexibility for users in various scenarios. However, conventional portable loudspeakers require hard-wired connection for certain inputs, thereby limiting functionality.

SUMMARY

All examples and features mentioned below can be combined in any technically possible way.

Various implementations include portable speakers configured to adjust audio output based on detected input connections.

In some particular aspects, a portable speaker includes an enclosure housing: at least one electro-acoustic transducer for providing an audio output; a processor coupled with the transducer; an audio input module coupled with the processor for receiving audio input signals; and a battery configured to power the at least one transducer, the processor, and the audio input module; an input channel for receiving a hard-wired audio input connection; and at least one wireless input channel for receiving an audio input from a source device via a wireless connection, where the processor is configured to: adjust an audio signal received from the hard-wired audio input connection if a source device is already connected via the wireless connection.

In additional particular aspects, a method of controlling a portable speaker includes: detecting a wireless connection with a first source device via the at least one wireless input channel; detecting a wired connection with a second source device via the hard-wired audio input connection after detecting the wireless connection with the first source device; and adjusting an audio signal from the second source device.

Implementations may include one of the following features, or any combination thereof.

In some cases, the processor switches the input channel to an effects loop in response to detecting the hard-wired audio input connection while the source device is already connected via the wireless connection.

In particular aspects, adjusting the audio signal includes adjusting a pre-amplification order of the audio signal prior to providing the audio output.

In certain implementations, wherein the processor is further configured to: receive the audio input from the source device via the wireless connection as a digital audio input; and convert the digital audio input to an analog audio signal.

In some aspects, the hard-wired audio input connection comprises a tip-sleeve (TS) connection, a tip-ring-sleeve (TRS) connection, or an XLR connection.

In particular cases, the at least one wireless input channel includes at least two wireless input channels.

In certain implementations, the portable speaker further includes at least two wireless transmitters detachably housed in the enclosure, each wireless transmitter for enabling the wireless connection between the source device and a corresponding one of the wireless input channels.

In some aspects, each of the wireless transmitters is configured to connect the source device with the portable speaker in response to detecting a connection with the source device.

In particular implementations, the portable speaker further includes a set of docks for housing the wireless transmitters.

In some aspects, the processor is configured to: in response to detecting that at least one of the wireless transmitters is powered on and paired with the portable speaker and detecting the hard-wired input connection, adjusting the audio input signal received from the hard-wired audio input connection to play as an effects loop.

In certain cases, the processor is configured to adjust the audio input signal from the hard-wired audio input connection to play as an effects loop only if the wireless transmitter is powered on and paired with the portable loudspeaker.

In particular implementations, the processor is configured to select the audio input based on a command from an application run on a connected smart device.

In some cases, adjusting the audio signal from the second source device includes switching the input channel to an effects loop in response to detecting the wired connection with the second source device while the first source device is already connected via the wireless connection.

In certain aspects, adjusting the audio signal includes adjusting a pre-amplification order of the audio signal prior to providing an audio output at the portable speaker.

In certain aspects, the portable speaker further includes: a battery configured to power the at least one transducer, the processor, and the audio input module; and a hard-wired power connector for charging the battery and powering the portable speaker.

In additional implementations, the portable speaker is part of a public address (PA) speaker.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

FIG. 1A is a perspective view of a portable powered public address (PA) loudspeaker system oriented in a first position, in accordance with various implementations.

FIG. 1B is a perspective view of the portable powered PA loudspeaker system of FIG. 1A oriented in a second position.

FIG. 1C is a perspective view of the portable powered PA loudspeaker system of FIGS. 1A and 1B oriented in a third position.

FIGS. 2A(1) and (2) are illustrations of acoustic coverage of the PA loudspeaker system oriented in the first position shown in FIG. 1A.

FIGS. 2B(1) and (2) are illustrations of acoustic coverage of the PA loudspeaker system oriented in the second position shown in FIG. 1B.

FIGS. 2C(1) and (2) are illustrations of acoustic coverage of the PA loudspeaker system oriented in the third position shown in FIG. 1C.

Figure 3:
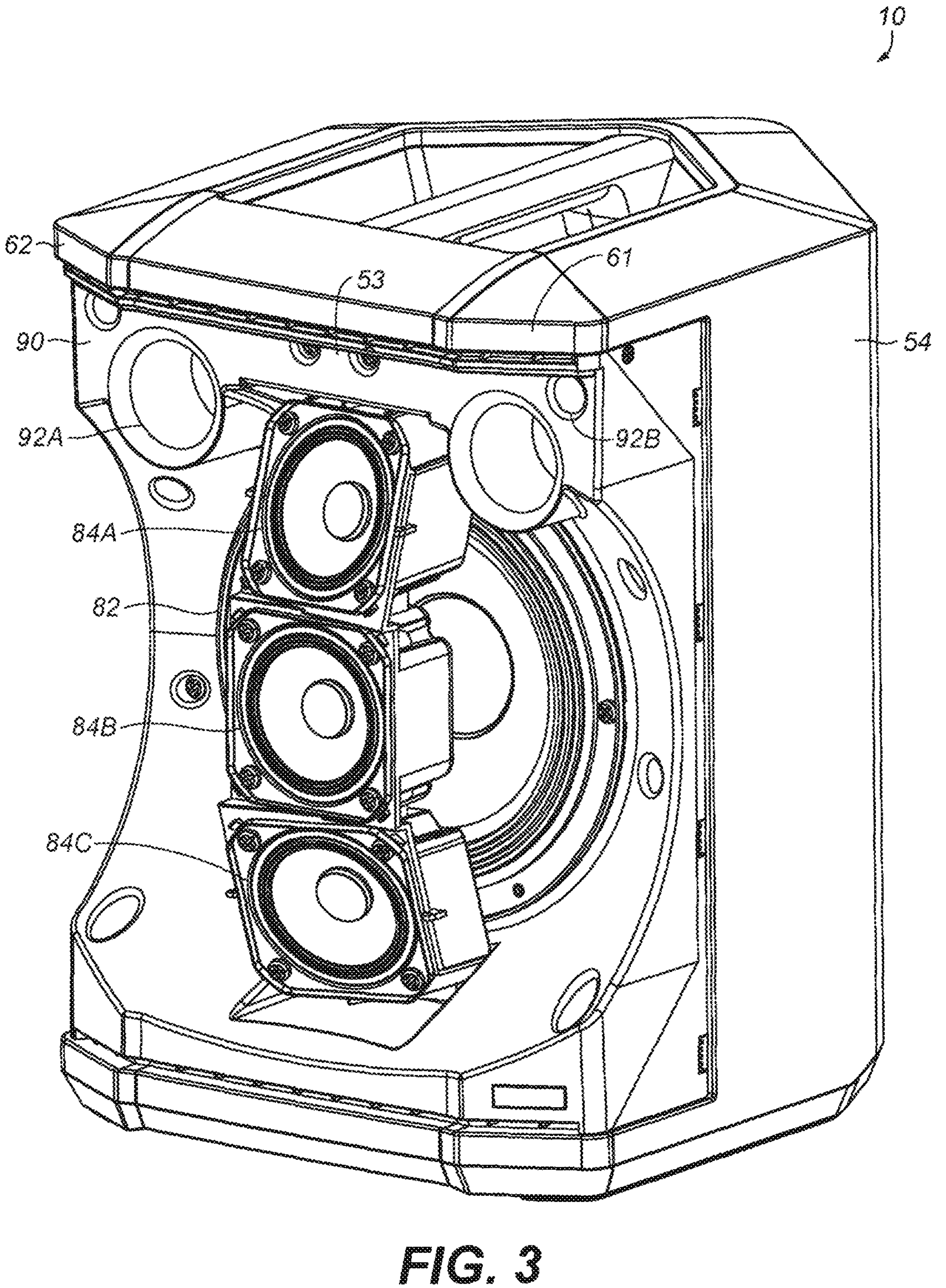
FIG. 3 is a perspective view of an interior of a PA loudspeaker system, in accordance with various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a portable speaker, such as a public address (PA) speaker, can benefit from automatically detecting audio source inputs to enhance the user experience. For example, a portable speaker can be configured to adjust an audio signal received from a hard-wired audio input connection if a source device is already connected via the wireless connection, e.g., triggering an effects loop.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value +/−a margin of error, such as a measurement error, which may range from up to 1-5 percent.

PA loudspeaker systems in some examples are constructed with specific target customer segments in mind. For example, a primary use of a PA loudspeaker system may be for a solo musician who requires a voice or instrument amplifier, for example, a guitar or drums, to perform street performances, or for a disk jockey who plays songs for a small audience. In another example, a PA loudspeaker system may be a general purpose electro-acoustic driver for amplifying sound, e.g., voice and/or instruments, in a classroom, home Karaoke event, or other event involving small groups of people. In yet other examples, a PA loudspeaker system may be required for a larger audience, such as an auditorium. While particular aspects of loudspeakers such as PA loudspeakers are described herein, additional features of such loudspeakers are also described and illustrated in U.S. Pat. No. 10,555,101 (filed Apr. 2, 2019) and U.S. Pat. No. 10,524,042 (filed Jun. 27, 2017), each of which is incorporated by reference in its entirety.

As shown in FIGS. 1A-1C, a portable powered loudspeaker (e.g., a PA speaker system) 10 may include an enclosure 22 (also referred to as a housing or cabinet) having a top portion 51, a base 52, and plurality of side surfaces extending between the top portion 51 and base 52. For example, as shown in FIGS. 1A-1C, the side surfaces may include a first 53, second 54, third 55, fourth 61, fifth 62, sixth 63, and seventh 64 side surface, each extending along a common direction of extension between a periphery the top portion 51 and base 52 to form an interior of the enclosure 22 where a set of mounted transducers are positioned, for example, shown in FIG. 3. In other examples, the enclosure 22 may have a different number of side surfaces having various widths or other dimensions, for example, fewer than or more than seven side surfaces. The enclosure 22 is constructed to be oriented vertically, horizontally, or angularly, for example, tangential or non-perpendicular to the ground surface on which the loudspeaker 10 is positioned.

The top portion 51 may include a plurality of inclined wall portions 121, 122, 123, 124, 125, 126, 127 that each incline, taper, or slope from a bottom region of the top portion 51 abutting the side surfaces to a top region, to provide ruggedness and portability to the loudspeaker 10. Each top wall portion 121-127 has a top horizontal border portion 131, a bottom vertical border portion 132, and a sloped or inclined portion 133 that extends between the top 131 and bottom 132 portions. Thus, the periphery of the bottom region of the top portion 51 formed by the bottom portions 132 of the top wall portions 121-127 may include a lip, and therefore be of a larger parameter than that of the top region formed by the top horizontal border portions 131. The lip formed by the vertical bottom portions 132 of the top wall portions 121-127 of the top portion 51 of the enclosure 22 may also have a width that is greater than a width of a portion of the enclosure 22 formed by the side surfaces 53, 54, 55, 61, 62, 63, and 64.

The top region of the collective wall portions 121-127 may include a horizontal top border that forms a cavity or recess in the top portion 51 in which a handle 72 may be positioned. The handle 72 can allow for easy, single-handed carrying and transport of the portable loudspeaker 10.

The top portion 51 may have a pentagon shape formed of wall portions 121, 123, 124, 125, and 126. However, the top portion 51 may not have a perfect pentagon shape (i.e., all five sides having a same length), since the wall portions may be of different lengths, and since other wall portions may extend between the five pentagonal sides. For example, as shown, the top portion may include wall portion 122 between wall portion 121 and 123 and wall portion 127 between wall portions 121 and 126, which provide a bevel or cutoff at regions that would otherwise be corners between wall portions 121 and 123 and 121 and 126, respectively. In some examples, top wall portions 121-127, and corners formed therebetween, may align along a common direction of extension as side surfaces 53, 54, 55, 61, 62, 63, and 64, and corners therebetween. For example, a corner region C' between wall portions 121 and 122 may extend along a same axis as corner region C" between side surfaces 53 and 61 as shown in FIG. 1A. In some examples, a base side surface, for example, side surface 142, may be a same width as an enclosure side surface, for example, 61. In other examples, the width of a base side surface may be different than that of a corresponding enclosure surface.

The base 52 on the opposite side of the enclosure 22 as the top portion 51 includes wall portions 141-147, or side portions that extend from a flat bottom surface portion 66 and angled bottom surface portion 67 of the base 52, at a predetermined angle, for example 30 degrees. Flat bottom surface portion 66 is coupled to, integral with, or otherwise aligned with side surfaces 52, 53, and 54. Angled bottom surface portion 67 is coupled to, integral with, or otherwise aligned with side surfaces 63 and 64, which each have a tapered surface to permit the taper of the bottom surface portion 67.

The base wall portions 141-147 of the base can include a first portion that inclines, tapers, or slopes from the bottom surface 66, 67, and a second portion that extends vertically, e.g., along a same or parallel plane as a corresponding side wall. The collective first base wall portions form a border having a smaller parameter than that of the second base wall portions. The border formed of second base wall portions, for example, may include a lip that is wider than a peripheral outer surface of the enclosure 22 formed by the side surfaces 53, 54, 55, 61, 62, 63, and 64.

Therefore, each of the top 51 and bottom base 52 may have a width, circumference, periphery, or related dimension that is greater than that of the peripheral sidewall region formed by the side surfaces 53, 54, 55, 61, 62, 63, and 64 so that some or all of the side surfaces are recessed relative to the top portion 51 and base 52, preventing elements from the walls, i.e., control elements 24, handle 72, and so on, from protruding past the outermost surface of the top portion 51 and base 52, therefore, permitting walls of the top portion 51 and base 52 to be positioned on a flat surface without interference of such elements.

In some examples, the enclosure 22 may be formed, molded, of a single material so that the top portion 51 and base 52 are unitary or integral with at least several of the side surfaces, for example, one piece. In some examples, all side surfaces except first side surface 53 are integral with the top portion 51 and base 52, for example, shown in FIG. 3. In some examples, one or more panels may be positioned over the enclosure 22, at least one panel forming or covering one of the side surfaces. For example, a front grille, screen, or panel 71 may form the first side surface 53 or may be positioned over another layer of material forming the first side surface 53, or may simply cover an opening of the enclosure. In some examples, the front grille 71 extends from the first surface 53 to at least a portion of adjacent side surfaces 62, 62, 54, and/or 55. In other examples, instead of a frame, the panels forming the side surfaces are directly coupled to each other to form a periphery about the interior of the enclosure 22.

In some examples, as shown in FIG. 3, electro-acoustic transducers are positioned to provide an audio output. For example, a horn-type woofer 82 and tweeters 84A-84C (generally, 84) may be positioned to output sound waves from the first side surface 53, and through the front grille 71. Also behind the front grille 71 may include two or more acoustic ports 92A, 92B (generally, 92) for permitting an air and/or acoustic flow path through the interior of the enclosure 22, for example, behind the woofer 82. In some examples, as shown in FIG. 3, a sub-enclosure 90 may be coupled to the system frame, for receiving and holding in place the woofer 82, tweeters 84, and acoustic ports 92. Multiple panels and/or sides, for example, side surfaces 53, 61, and 62 may be positioned over the sub-enclosure 90.

Figure 4:
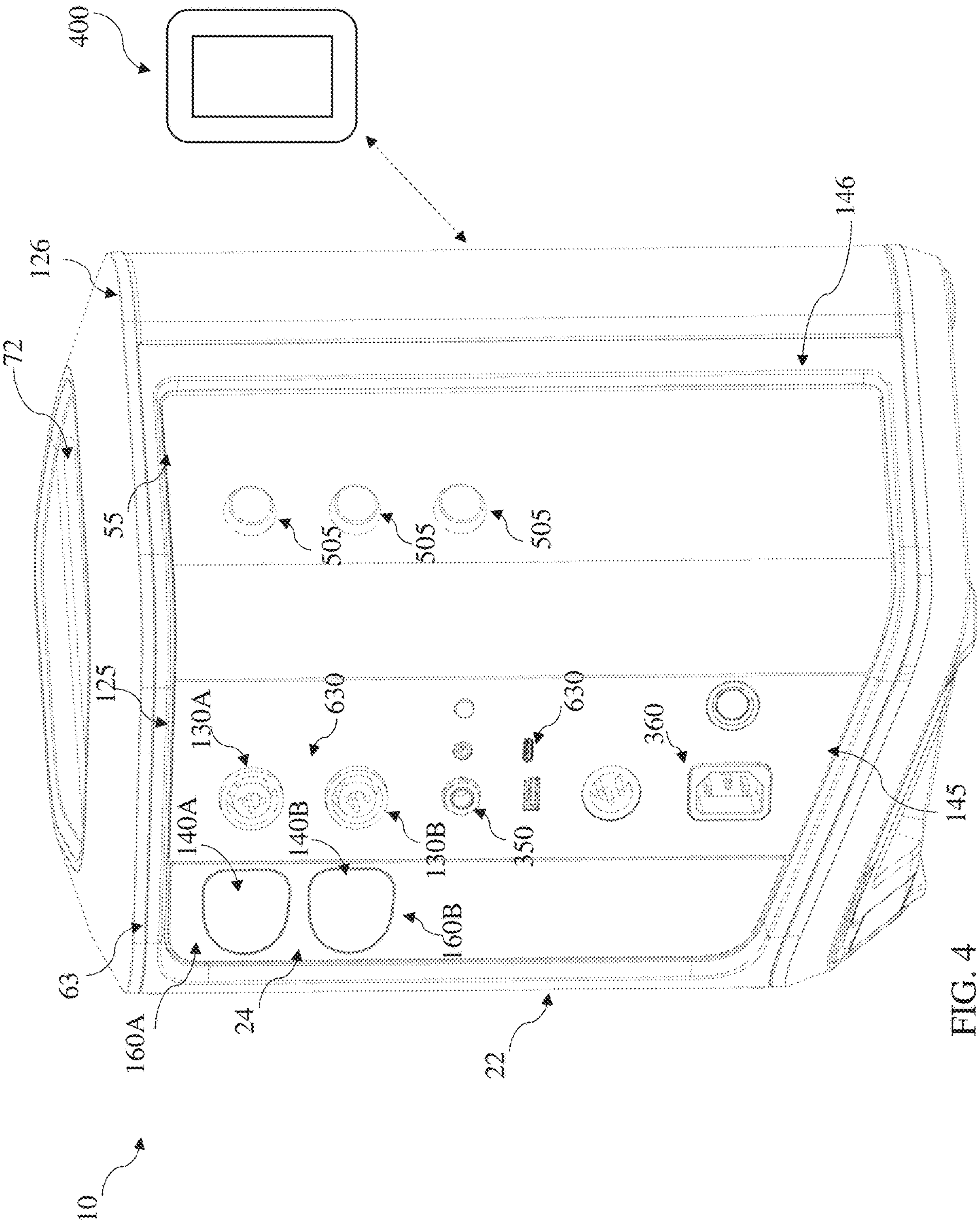
FIG. 4 is another perspective view of the PA loudspeaker system of FIGS. 1A-3 oriented in the first position, including a view of a set of control knobs and switches positioned at one or more sides of the PA loudspeaker system, in accordance with various implementations.

FIG. 4 illustrates one of the side surfaces (e.g., side surface 63) that includes one or more control elements 24, such as interfaces, connectors, knobs, switches, etc. In certain implementations, the control elements 24 can be located on a same side of the loudspeaker 10, e.g., side surface 63. In other implementations, control elements 24 can be distributed across two or more surfaces of the enclosure 22. Various additional aspects of the loudspeaker 10 are described in the following sections, features of which can be implemented separately or in any technically feasible combination.

Detachable Wireless Transmitter(s)

Figure 5:
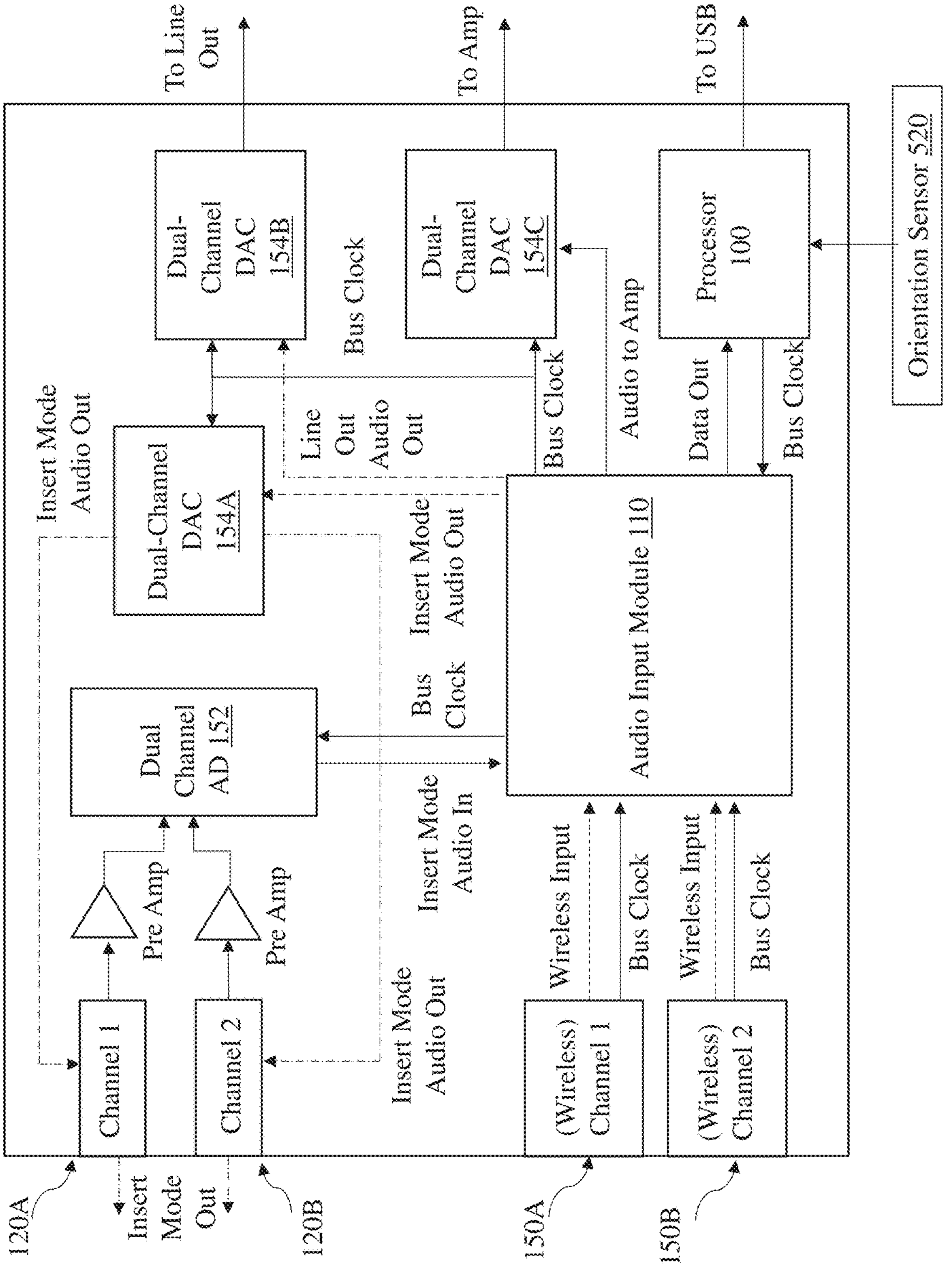
FIG. 5 is signal flow diagram illustrating audio paths and bus paths in a loudspeaker according to various implementations.

FIG. 5 is a system diagram illustrating signal flow paths to and from the loudspeaker 10 according to various implementations. In certain cases, the signal flow paths illustrate audio signal and/or control signal flows to/from the loudspeaker 10 and/or between components contained in the enclosure 22. Certain control components are not illustrated, but can be similarly deployed as described in U.S. Pat. No. 10,555,101. For example, the loudspeaker 10 can include one or more orientation sensor(s) (e.g., an inertial measurement unit, a magnetometer/gyroscope/accelerometer, etc.) for detecting a change in orientation of the loudspeaker 10 and adjusting an equalization setting for the audio output based on that detected orientation change.

In various implementations, the loudspeaker 10 includes a processor 100 (e.g., a system processor that can include one or more microcontrollers)) that is coupled with an audio input module 110 for receiving audio input signals from one or more source devices. In various implementations, the audio input module 110 can include an audio processor module (not shown) for communicating with the system processor 100. In certain implementations, the audio input module 110 can include a wireless communication module, e.g., a Bluetooth or BLE module for communicating with one or more devices over a wireless communication protocol. The processor 100 can be configured to control the amplifier inputs and outputs, including sensor(s) inputs, outputs to fans and other temperature control components, and inputs/outputs to driver (transducer) connectors, such as low-frequency, mid-frequency and high-frequency driver outputs. The processor 100 is also configured to send and receive audio and control signals, e.g., via an amplifier module connector.

In particular cases, the audio input module 110 is configured to receive audio input signals from two or more source devices, which can include distinct types of source device. The loudspeaker 10 is shown including at least one input channel (two shown, as 120A, 120B) for receiving a hardwired audio input connection at the enclosure 22. The corresponding input connectors 130A, 130B for channels 120A, 120B are illustrated in FIG. 4. Additionally, as shown in FIGS. 4 and 5, the loudspeaker 10 can further include at least one wireless transmitter 140 (example of two transmitters 140A, 140B shown) detachably housed in the enclosure 22 and in communication with a corresponding wireless input channel 150 (example of two input channels 150A, 150B, shown in FIG. 5) for receiving audio input from a source device (e.g., an instrument, a microphone, etc.). In certain implementations, each wireless input channel 150 corresponds to an input channel 120A, 120B for receiving a hard-wired input connection (e.g., at connectors 130A, 130B). That is, the loudspeaker 10 enables a user to connect a source device either wirelessly, or via a hard-wired connection, to the same input channel (e.g., Channel 1, Channel 2, etc.). In the example shown in FIGS. 4 and 5, two wireless transmitters 140A, 140B are shown that correspond with a distinct wireless input channel 150A, 150B and enable distinct wireless connections between a source device and the channels 150A, 150B.

Figure 6:
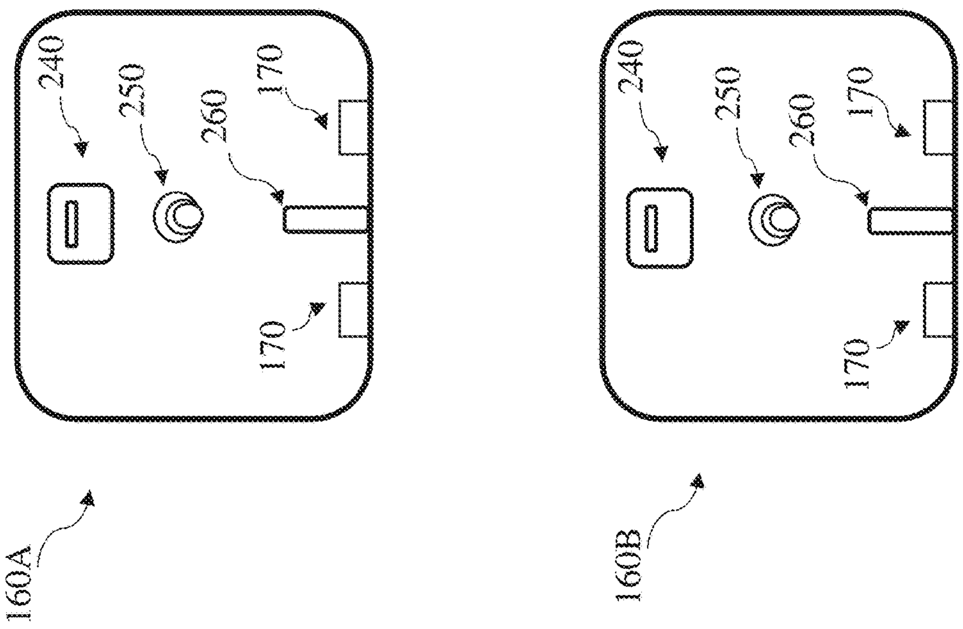
FIG. 6 shows an end view of a set of docks in a loudspeaker according to various implementations.

FIG. 5 illustrates additional components in the loudspeaker circuitry for performing audio and/or control processes, including, e.g., an analog-to-digital converter (ADC) 152 and stereo digital-to-analog converters 154A, 154B, 154C. Certain data flow and signal flow paths are shown for illustrative purposes, and are not intended to limit the various implementations. In certain cases, wireless connection flow paths are contrasted with hard-wired connection flow paths by "Wireless FIG. 6 is a close-up view of dock(s) 160 for housing transmitter(s) 140, with the transmitters 140 removed. In various implementations, transmitter 140 is configured to mechanically engage and disengage from the loudspeaker 10 at the dock 160. According to certain implementations, the dock 160 has a greater depth than a width or height, allowing it to receive the connector for each transmitter 140. In particular cases, the transmitter 140 is detachable from, and attachable to, the loudspeaker 10 at the dock 160 without a tool or other external device. For example, the transmitter 140 can be configured to connect with the dock 160 via interlocking arm(s) or hook(s), spring-loaded mounts, force-fit connectors, etc. In these cases, the user can connect and disconnect the transmitter 140 from the loudspeaker 10 by hand.

Figure 8:
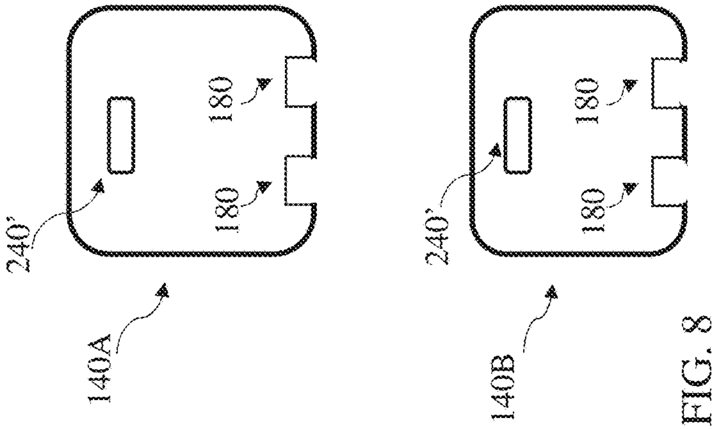
FIG. 8 shows an end view, respectively, of a set of wireless transmitters for a loudspeaker according to various implementations.
Figure 7:
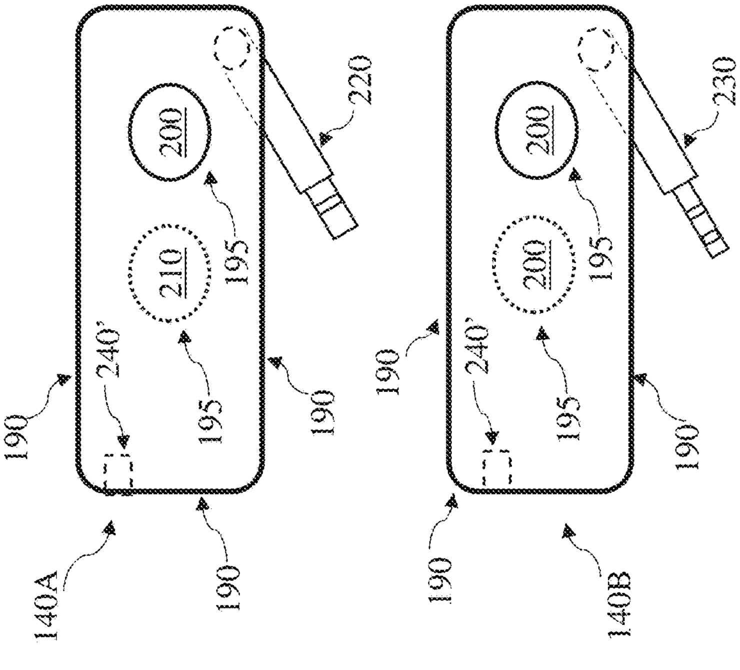
FIG. 7 shows a side view.

FIG. 7 is a side view of a set of transmitters 140 removed from a dock 160. FIG. 8 shows an end view of the transmitters 140 in FIG. 7. With reference to FIGS. 6-8, the transmitter 140 can be configured to slide into and out of the dock 160 on one or more rails 170 or other guide members in the dock 160. In some cases, each dock 160 has a pair of rails 170 for aligning a corresponding transmitter 140 when docked. In certain implementations, as illustrated in FIG. 8, the transmitter 140 can include a recess 180 (two shown in this example) that complements a rail 170. In other cases, a recess can be positioned in the dock 160 and a rail (or similar protrusion) can be positioned on the transmitter 140. That is, any manner of complementary alignment features can be utilized to align the transmitter 140 in the dock 160. In additional implementations, the transmitter 140 includes a compliant material 190 at an interface with the dock 160. This compliant material 190 may differ from a stiffer material located on other portions of the transmitter 140, and may enable a desirable, consistent fit between the body of the transmitter 140 and the dock 160.

In some implementations, each transmitter 140 can include a command button 195 for controlling one or more functions of the transmitter 140. For example, as shown in FIG. 7, the transmitter 140 can include a power button 200 for powering the transmitter 140 on and/or off. In some implementations, as illustrated optionally in phantom, the transmitter 140 can also include a mute button 210 for muting the output from the transmitter 140.

In certain implementations, as shown in FIG. 7, one of the transmitters 140A includes a tip-sleeve (TS) audio connector 220 for coupling with a source device. As depicted, the TS audio connector 220 is configured to nest or otherwise retract into the body of the transmitter 140A, which can protect the connector 220 as well as enable docking and removal from the dock(s) 160. FIG. 7 shows the connector in an intermediate state, with a portion of the TS audio connector 220 outside of the body of the transmitter 140. It is understood that in certain implementations, the TS audio connector 220 can be substituted with a tip-ring-sleeve (TRS) audio connector. The TS audio connector 220 can be configured to couple with a source device such as an electric instrument (e.g., guitar, keyboard, etc.) or any other output device with a corresponding TS mating connection. In additional implementations, one of the transmitters 140B includes an XLR audio connector 230 for coupling with a source device. The XLR audio connector 230 can be configured to couple with a source device such as a microphone or other line level source(s). In various implementations, each dock 160 is configured to receive any of the transmitters 140. That is, a first dock 160A can be configured to receive either transmitter 140A or transmitter 140B, and second dock 160B can be configured to receiver either transmitter 140A or transmitter 140B. Further, it is understood that input connectors 130 can be configured to make physical connections with TS, TRS and/or XLR audio connectors.

As described herein, the dock(s) 160 can provide both a physical and electrical connection with transmitter(s) 140 for storage as well as power/charging and communication. For example, looking at FIGS. 7 and 8, each dock 160 can include an electrical and/or data connector 240 for coupling with a corresponding connector 240' (illustrated as internal to the body) on the transmitter 140. In certain cases, the electrical and/or data connector 240 can include a USB connector. In particular examples, connector 240 (e.g., a USB or variation such as USB-C connector) enables a software update of the transmitter 140, or a debug accessory mode (DAM) operation at the transmitter 140.

Dock 160 can also include a spring-loaded coupling 250 and a magnet 260 (or a plurality of magnets). In certain cases, the spring-loaded coupling 250 allows a user to perform a push-to-engage and/or push-to-release function to couple and decouple, respectively, the transmitter 140 from the dock 160. In certain cases, when docked, the outer face of the transmitter 140 is approximately flush with the outer surface of the enclosure 22. This position can be maintained by the spring-loaded coupling and magnet 260. In certain cases, the spring-loaded coupling 250 enables release of the transmitter 140 such that a user can grab the transmitter 140 to remove from the dock 160. In particular cases, the connector 240 (e.g., USB connector) is maintained in an intermediate position, such that the transmitter 140 remains connected to the magnet 260 and the connector 240 even after release of the spring-loaded coupling 250. In other terms, a force greater than the spring force of the coupling 250 is required to overcome the coupling of the transmitter 140 with the connector 240 and the magnet 260. In this sense, the connector (e.g., USB connector) 240 has a minimal retention force to maintain the data connection with the loudspeaker 10.

In some cases, each wireless transmitter 140 has a battery and is configured to initiate charging of the battery in response to being engaged in one of the docks 160. For example, in response to detecting a connection at connector 240 (e.g., USB connection), the processor at the loudspeaker 10 is configured to initiate charging of the transmitter 140.

In additional implementations, each transmitter 140 is configured to connect a source device (e.g., instrument, microphone, etc.) with a corresponding wireless input channel (e.g., Channel 1, Channel 2, etc.) in response to detecting a connection with the source device. In certain implementations, once the user connects the transmitter 140 with the source device, the transmitter 140 automatically pairs the source device with the input channel (e.g., Channel 1, Channel 2, etc.). In certain implementations, if the transmitter 140 is in a sleep or standby state prior to connection with the source device, the transmitter 140 is configured to wake in response to detecting the connection with the source device. In particular cases, the transmitter 140 in a sleep or standby state first wakes, then connects the source device with the input channel in response to detecting the connection.

Figure 9:
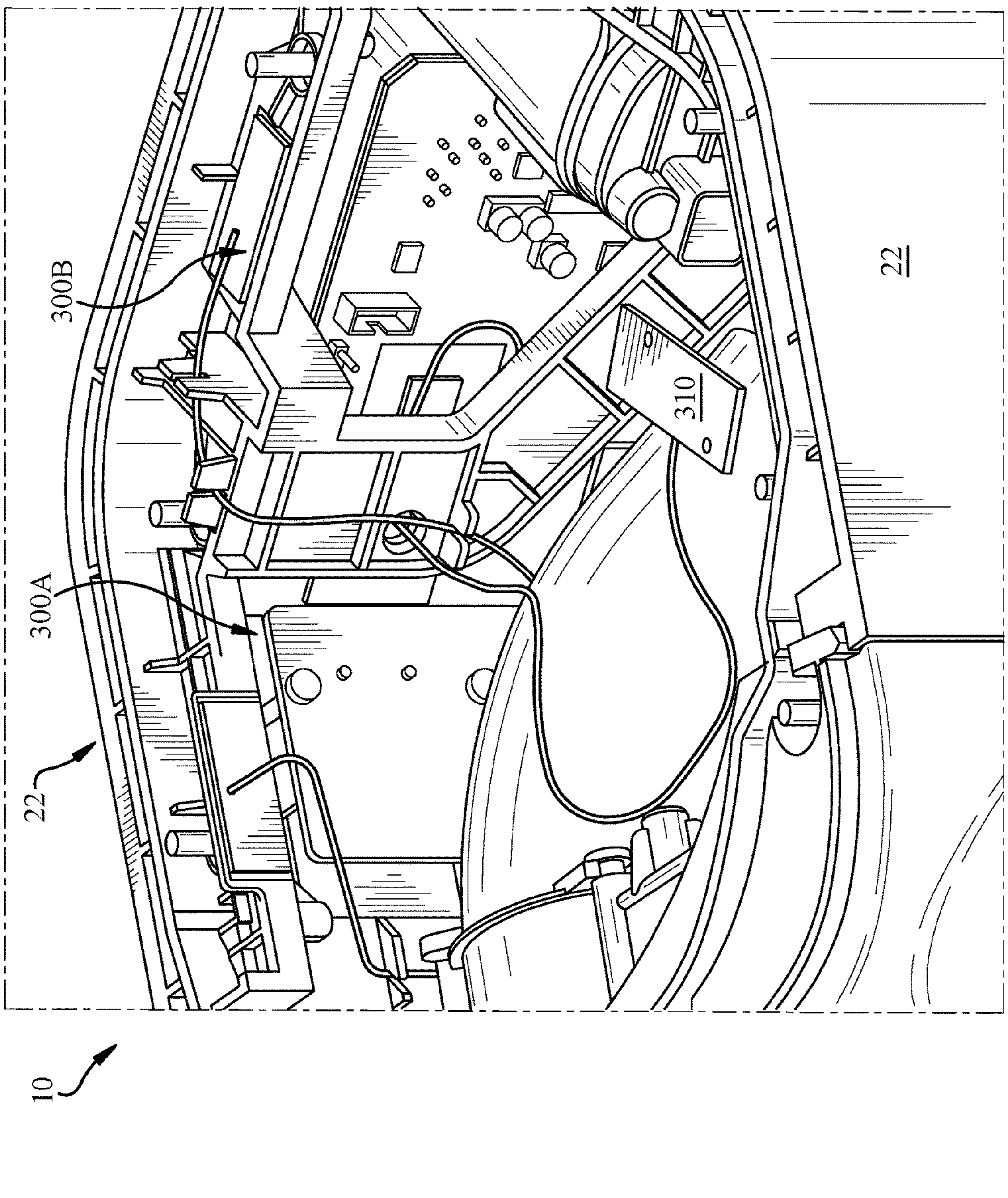
FIG. 9 is a perspective cut-away view of a loudspeaker illustrating antennae locations according to various implementations.

As described herein, in scenarios where the loudspeaker 10 has multiple transmitters 140 for sending signals to multiple input channels (e.g., Channel 1, Channel 2), the processor at the loudspeaker 10 is configured to receive audio input from each of the wireless input channels. In particular cases, each wireless input channel has a separate wireless antenna. In some cases, the separate antenna are dedicated to the corresponding wireless input channel. FIG. 9 illustrates a perspective cut-away view of a portion of the loudspeaker 10, illustrating an example of two separate wireless antenna 300A, 300B (e.g., radio frequency (RF) antenna), along with a Bluetooth (BT) antenna 310. In certain implementations, each antenna 300A, 300B is positioned and directed to provide approximately uniform omnidirectional sensitivity to wireless signals from corresponding wireless transmitters 140 along a plane. That is, along a given plane, such as at a height relative to a ground or floor surface, each of the antennas 300A, 300B is approximately uniformly sensitive to wireless signals from a corresponding transmitter 140 in all directions. This allows a user to connect the wireless transmitter 140 for either channel to a source device (e.g., microphone, instrument, etc.) and move around the loudspeaker 10 within a plane without a noticeable difference in wireless signal quality. In certain cases, as noted herein, the loudspeaker 10 is configured to operate in multiple orientations, and each antenna 300A, 300B maintains the approximately uniform omnidirectional sensitivity to wireless signals from the corresponding transmitter (e.g., transmitter 140A, transmitter 140B) along the plane regardless of the orientation of the loudspeaker 10.

In certain implementations, the audio input to the loudspeaker 10 can be controlled by one or more control elements 24 (FIG. 4), such as via a command interface, GUI, dial, button, etc. In additional implementations, the audio input to the loudspeaker 10 can be controlled by a command from an application run on a connected smart device. That is, a user can control the selection of the audio input (e.g., from Bluetooth device, transmitter 140A, transmitter 140B, etc.) with a command from an application run on a connected smart device such as a smart phone, tablet, or dedicated controller.

In additional implementations, the loudspeaker 10 is configured to wirelessly connect with a first additional portable speaker over one of the wireless input channels. For example, the loudspeaker 10 can connect with an additional, similar loudspeaker via a Bluetooth connection (e.g., via BT antenna 310), or via another wireless communication protocol (e.g., Wi-Fi). In certain of these cases, the loudspeaker 10 can provide audio output to the first additional portable speaker via the wireless connection.

In still further implementations, the loudspeaker 10 is configured to wirelessly connect with a second additional portable speaker (e.g., similar to loudspeaker 10) via the wireless input channels and a line-out connection at the second additional portable speaker. In these cases, the loudspeaker 10 is configured to receive audio input from the second additional portable speaker via one of the wireless transmitters 140 coupled with a line-out connector 350 (FIG. 4), forming a wireless daisy chain between the loudspeakers 10.

As noted herein, loudspeaker 10 is configured for both wired power (hard-wired) usage as well as portable (e.g., battery-powered) usage. That is, as shown in FIG. 4, the enclosure 22 can include a hard-wired power connector 360 for charging an on-board battery (housed in enclosure 22) that can power the transducer(s), processor(s), audio input module(s), etc. The hard-wired power connector 360 can also provide power for charging the wireless transmitters 140, which as described herein, include on-board power storage (e.g., battery/batteries). In various implementations, the battery/batteries in the loudspeaker 10 and/or transmitters 140 are rechargeable and/or replaceable.

Automatic Detecting Input Channel

Figure 10:
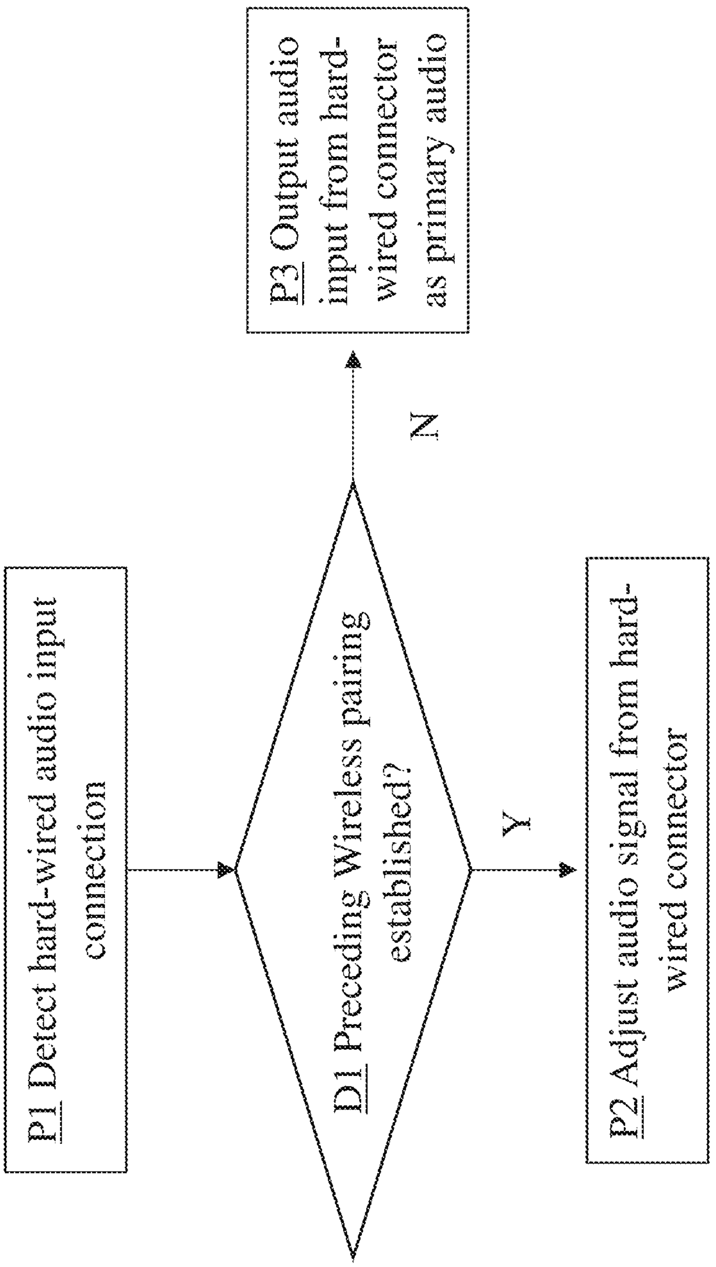
FIG. 10 is a flow diagram illustrating processes in a method according to various implementations.

In particular implementations, the loudspeaker 10 is configured to automatically detect input channels and adjust audio input signals accordingly. In particular cases, the processor 100 is configured to adjust audio signals received from the hard-wired input connection 130 and/or wireless transmitter 140 based on one or more of connection status or connection order. FIG. 10 illustrates a method performed by the processor 100 in managing input connections according to various implementations. For example, in certain cases, the processor 100 is configured to detect a hard-wired audio input connection at connector 130 (process P1), and state of a wireless connection with transmitter 140 (decision D1), and if the wireless connection precedes the hard-wired connection at connector 130 (Yes to D1), the processor 100 adjusts the audio signal from the hard-wired connector 130 (process P2). If a wireless connection does not precede the hard-wired connection (No to D1) the processor 100 outputs the audio input from the hard-wired connector 130 as primary audio (process P3).

In particular implementations, decision D1 (detecting state of wireless connection with transmitter) includes checking whether the wireless transmitter 140 is present in a corresponding dock 160 prior to determining whether an audio input from a source device is detected over the wireless connection 150. In certain of these cases, the processor 100 can determine first whether a wireless transmitter 140 is powered on, and if so, can then determine whether the transmitter 140 is paired with the corresponding channel (e.g., Channel 1 or Channel 2). In further cases, the processor 100 determines whether audio input is being received via the paired wireless transmitter 140. According to some implementations, the loudspeaker 10 only adjusts the audio signal from the hard-wired connector 130 (process P2) if a wireless transmitter 140 is powered on and paired with the corresponding input channel (e.g., Channel 1 or Channel 2). In further implementations, the loudspeaker 10 only adjusts the audio signal from the hard-wired connector 130 (process P2) if a wireless transmitter 140 is paired and an audio input is being received from that transmitter 140. If the processor 100 determines that a transmitter 140 is powered on, but not paired or not providing an audio input, the processor 100 prioritizes the hard-wired connection and outputs the audio input from connector 130 as primary audio (process P3).

In particular examples, adjusting the audio signal in process P2 includes switching the input channel 120 for the hard-wired connector 130 to an effects loop. In certain of these cases, adjusting the audio signal in process P2 includes adjusting a pre-amplification order of the audio signal (from hard-wired connector 130) prior to providing the audio output, for example, by prioritizing amplification of the wireless signal from transmitter 140 over the signal from the hard-wired connector 130. In various implementations, the audio input from the source device (e.g., microphone, instrument, additional connected speaker or audio gateway) received via the hard-wired connector 130 is received as a digital audio input and converted to an analog audio signal. In particular cases, the transmitter 140 transmits at a frequency of approximately 2.4 giga-Hertz (GHz).

Returning to FIG. 4, in particular implementations, the processor 100 is configured to select the audio input (e.g., between transmitters 140A, 140B, connector 130) based on a command from an application run on a connected smart device 400 (e.g., smart phone, smart watch, tablet, controller, etc.). In particular cases, the smart device 400 runs or otherwise accesses a program (e.g., application) configured to control functions of the loudspeaker 10, e.g., selecting inputs, adjusting volume and/or equalization settings, controlling power settings (e.g., on/off/standby), etc. In certain cases, functions of the application can be executed on a dedicated controller in addition to, or alternatively to, the smart device 400.

As is further illustrated in FIG. 4, the loudspeaker 10 can include hard-wired power connector 360 (e.g., to connect with an external power source) for charging the onboard battery and powering the loudspeaker 10.

Dynamic Display Characteristics

Figure 11:
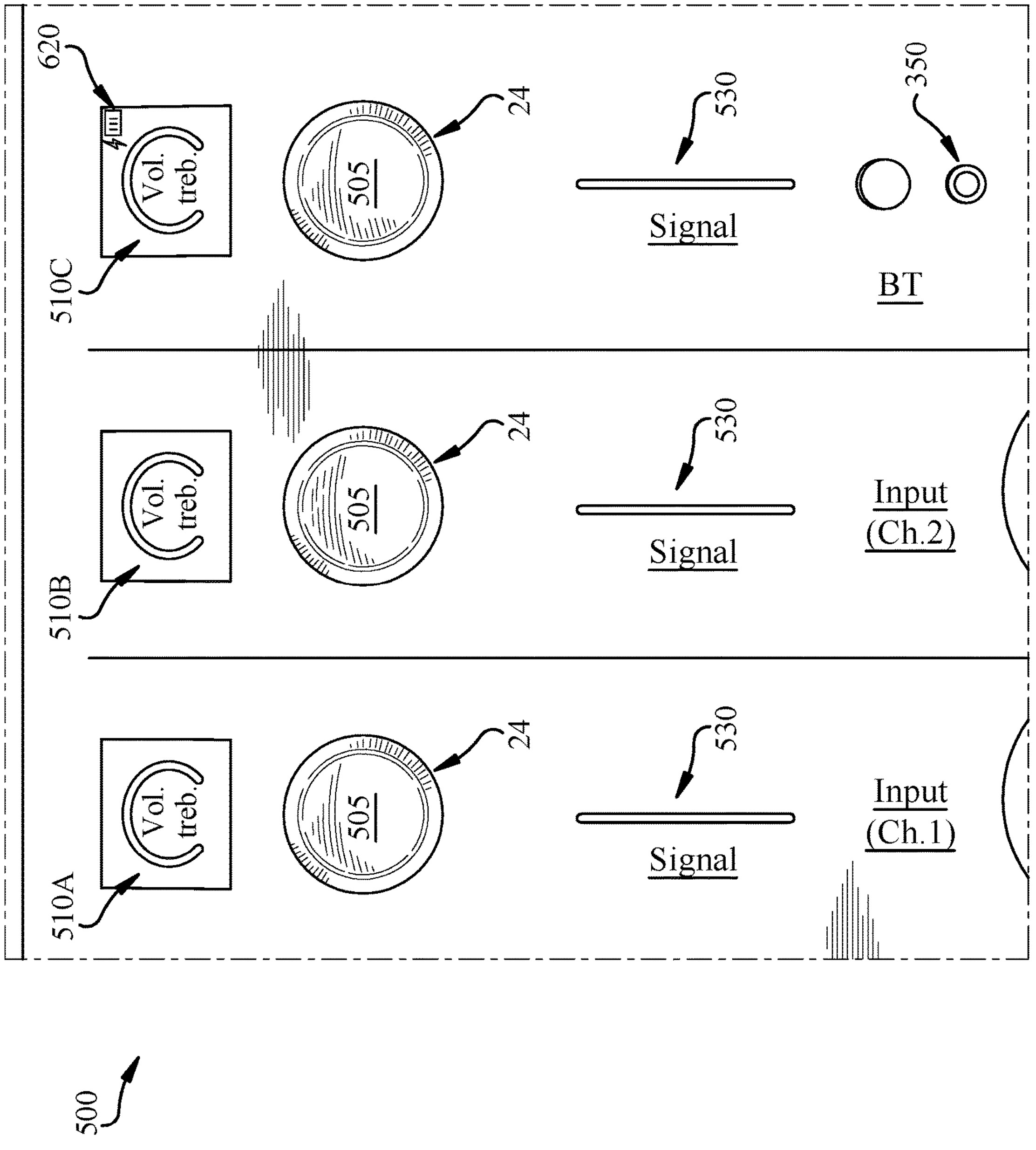
FIG. 11 is close-up depiction of a display in a first orientation, according to various implementations.

FIG. 11 shows a close-up view of a display 500, which can include one or more control elements 24 illustrated in FIG. 4. The display 500 can be located on any of the surfaces of the loudspeaker 10, and in particular cases, is located adjacent to the control elements 24. Examples of control elements 24 shown in FIG. 11 include volume adjustment controls (e.g., knobs) 505 for each of a plurality of inputs (e.g., Channel 1, Channel 2, and BT input). In certain implementations, the display 500 includes a plurality of sub-displays 510A, 510B, 510C. One or more aspects of the display 500 can include digital display elements such as a digital screen or window, e.g., as illustrated in sub-displays 510A, 510B, 510C. In some cases, the sub-displays include organic light emitting diodes (oLEDs).

Figure 12:
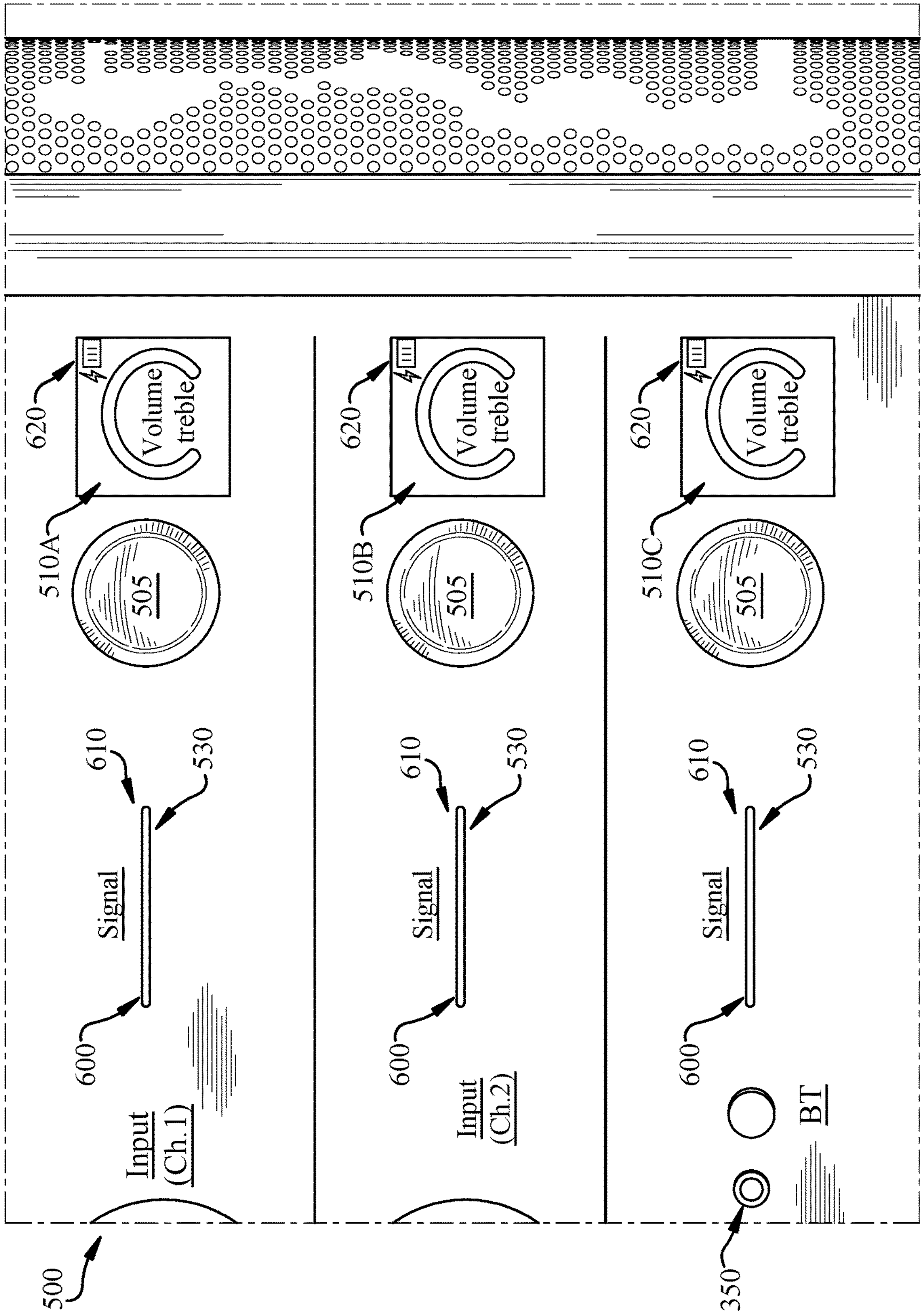
FIG. 12 is a close-up depiction of the display in a second orientation, according to various implementations.

In various implementations, as illustrated in FIGS. 11 and 12, the orientation of the display 500 is configured to adjust between a first orientation (FIG. 11) and a second orientation (FIG. 12) in response to detecting a change in orientation of the loudspeaker 10. That is, when the loudspeaker orientation is adjusted between two or more orientations, the display 500 (e.g., including one or more sub-displays 510A, 510B, 510C) is adjusted between at least two orientations. FIG. 11 shows a first orientation of the display 500 relative to the loudspeaker 10 and FIG. 12 shows a second orientation of the display 500 relative to the loudspeaker 10. In certain implementations, the orientation of the display 500 is intended to be easily discernable to a user in a given loudspeaker orientation, e.g., readable from left-to-right and vertically oriented. As described herein, the loudspeaker 10 can be configured to operate in at least three distinct predetermined playback orientations (e.g., as shown in FIG. 1A, FIG. 1B and FIG. 1C). In certain examples, the first orientation of the display 500 corresponds with two or more of the playback orientations (e.g., as shown in FIG. 1A and FIG. 1B), while the second orientation of the display 500 corresponds with a distinct playback orientation (e.g., in FIG. 1C).

Figure 13:
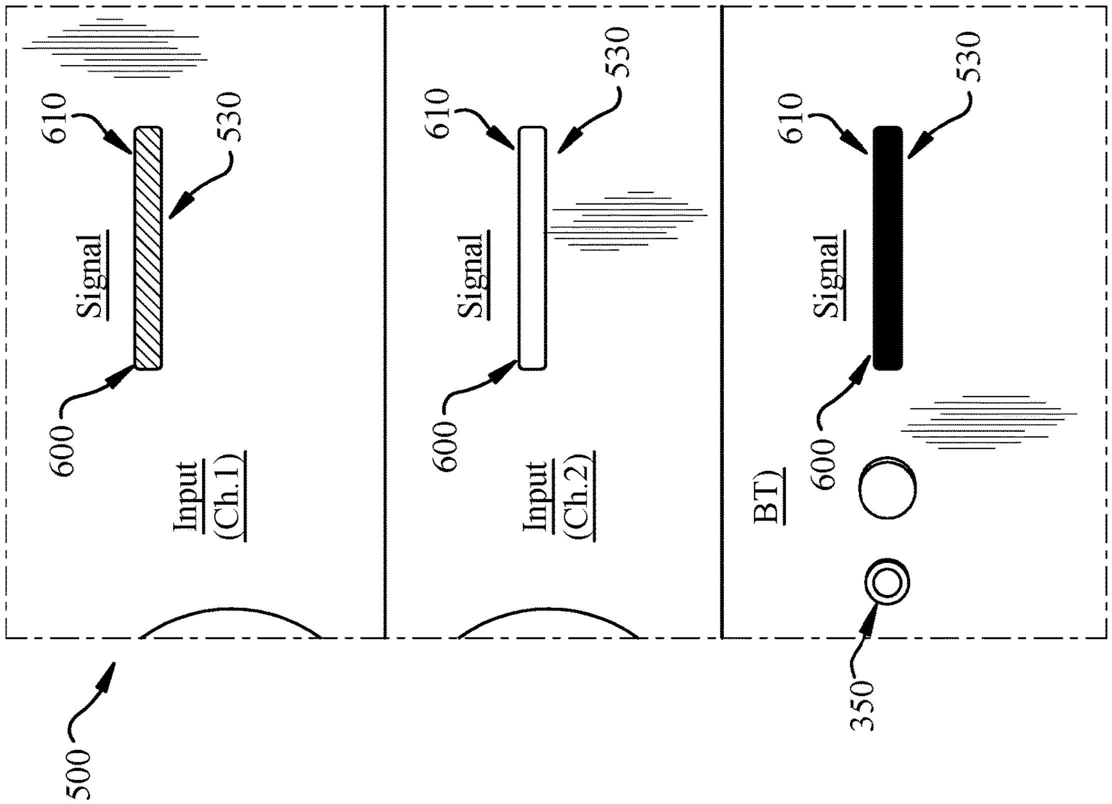
FIG. 13 is a close-up depiction of a portion of a display according to various implementations.

As noted herein, the processor 100 is coupled with an orientation sensor 520 (FIG. 5) for indicating an orientation of the loudspeaker 10. The orientation sensor 520 can include a gyroscope, a magnetometer, an accelerometer and/or an inertial measurement unit (IMU), and can be configured to provide data to the processor 100 regarding changes in orientation in response to detecting such changes, e.g., as modified by a threshold and/or hysteresis factor. In a particular example as shown in FIGS. 11 and 12, the display 500 includes a set of visual signal indicators 530 corresponding with the input channels (e.g., hard-wired channel connections 130A, 130B and/or wireless connections 150A, 150B). As illustrated in FIGS. 11 and 12, the visual signal indicators 530 can provide visual feedback about the signals received at each of the input channels (e.g., via hard-wired connection(s) 130A, 130B and/or wireless connection(s) 150A, 150B). In one example, as shown in a close-up view of the visual signal indicators 530 in FIG. 13, the set of visual signal indicators 530 each have a lower signal end 600 and a higher signal end 610 spanning between: the input channel (connector) 130A, 130B or the dock 160A, 160B, and a corresponding display screen 510A, 510B associated with a given one of the channels. According to some implementations, each visual signal indicator 530 is configured to indicate one or more of: i) no signal (e.g., lack of fill, as shown in Ch. 2), ii) sufficient signal (e.g., green as shown in Ch. 1), or iii) clipping (e.g., an inconsistent signal, or high signal level, as sampled at −50 ms intervals and illustrated, e.g., red as in BT channel). In certain cases, e.g., where the loudspeaker 10 is in an upright orientation (FIGS. 12, 13), the visual signal indicator 530 spans from the lower signal end 600 at a left-side portion of the display 500 to the higher signal end 610 at a right-side portion of the display 500.

In additional implementations, the display 500 further includes a set of visual battery level indicators 620 (FIG. 11, FIG. 12) corresponding with each of the detachably housed wireless transmitters 140 associated with each wireless input channel 150. In particular cases, battery level indicators 620 can indicate a remaining battery amount (e.g., in percentage terms, level, and/or time) for transmitters 140 that are absent from a corresponding dock 160. Additionally, battery level indicators 620 can display an indicator that a battery is in the process of charging, and/or is fully charged (when applicable), when the transmitter 140 is in a given dock 160. Battery level indicators 620 can also indicate a battery level in a connected Bluetooth device, e.g., connected via BT channel shown in FIGS. 11-13.

In particular implementations, the processor 100 is further configured to communicate with the application run on smart device 400 (FIG. 4) to provide an additional visual signal indicator or an audible signal indicator. For example, a visual signal indicator at the smart device 400 can be displayed through the application interface, e.g., in a progressive manner, to provide information to the user about the signal received via the input channels. The visual signal level indicators at the smart device 400 can be similar in format and/or style to the visual signal indicators 530 on the display of the loudspeaker 10, or can take a different format and/or style. In various implementations, the visual signal level indicators at the smart device 400 are part of a digital display. Additionally, the application can initiate an audible signal indicator via the smart device 400 speakers, such as an audible beep, chime or tone, clipping sound, etc., to indicate a characteristic of the signal received at the channel (s). Even further, the visual and/or audible signal indicators can include information about suggested adjustment(s) to improve the signal received at the speaker 10. For example, the suggested adjustment can include a message (e.g., visual and/or audible) that suggest the user adjust the physical connection (e.g., at hard-wired connector 130), or that the user move the transmitter 140 closer to the speaker 10 (e.g., for wireless transmitter 140).

In additional implementations, the processor 100 is configured to provide an error indicator at the display 500 in response to detecting that the speaker 10 is mis-oriented relative to the predetermined playback orientations. For example, the processor 100 can provide an error indicator (e.g., visual indicator at display 500, and/or audible indicator via the transducer(s) 82, 84 that the speaker 10 is tipped or upside down. In certain implementations, a tipped position is indicated by the speaker 10 being between predetermined playback orientations, or otherwise in an unstable position. In additional implementations, a tipped position is defined by the speaker 10 being in an orientation other than the three predefined orientations in FIGS. 1A, 1B, and 1C. An upside down orientation can be defined as any position where the upper surface (e.g., at top portion 51) of the speaker 10 is below the lower surface (e.g., at bottom portion 52).

Returning to FIGS. 11 and 12, in some examples, the display 500 can include three distinct sub-displays 510A, 510B, 510C that are each associated with an actuatable button, knob, switch, etc. In some cases, the actuatable button includes control 505. While the button(s) 505 are illustrated as separate from the associated sub-display(s) 510, in certain implementations, the sub-displays 510 are capable of receiving a push-button command in addition to, or in place of the button 505. That is, the display(s) 510 can include touch interfaces (e.g., capacitive touch interfaces) for receiving touch commands from a user. In any case, the button 505 (and/or display 510) can be configured to receive one or more commands, and in particular cases, a press-and-hold command at a given button 505 presents a configuration menu on the associated display 510. A configuration menu can include a configuration selection and/or adjustment option for a plurality of loudspeaker configurations, for example: battery mode (e.g., low power mode), settings (e.g., audio settings such as equalization, or sleep timer settings), and/or a shutdown menu enabling shutdown of the loudspeaker 10. In certain implementations, as illustrated in FIG. 4, the display 500 further includes a tone match preset switch 630 for enabling tone matching for each of the input channels, including wireless channel inputs from transmitters 140.

As described herein, the loudspeaker 10 can provide a number of practical and beneficial configurations for users, including but not limited to: wireless instrument and/or microphone connectivity, automatic channel detection and audio adjustment and dynamic display characteristics. As compared with conventional portable loudspeakers, e.g., portable PA loudspeakers, the loudspeaker 10 can enhance the user experience and provide numerous benefits.

One or more components in the loudspeaker 10 can be formed of any conventional loudspeaker material, e.g., a heavy plastic, metal (e.g., aluminum, or alloys such as alloys of aluminum), composite material, etc. It is understood that the relative proportions, sizes and shapes of the loudspeaker 10 and components and features thereof as shown in the FIGURES included herein can be merely illustrative of such physical attributes of these components. That is, these proportions, shapes and sizes can be modified according to various implementations to fit a variety of products.

As used herein, controllers and/or control circuit(s), where applicable, can include a processor and/or microcontroller, which in turn can include electro-mechanical control hardware/software, and decoders, DSP hardware/software, etc. for playing back (rendering) audio content at the loudspeaker 10, as well as for communicating with other components in the loudspeaker 10. The control circuit(s) can also include one or more digital-to-analog (D/A) converters for converting the digital audio signal to an analog audio signal. This audio hardware can also include one or more amplifiers which provide amplified analog audio signals to the loudspeaker(s) 10. In additional implementations, the controller/control circuit(s) include sensor data processing logic for processing data from sensors.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A portable speaker, comprising:

an enclosure housing:

at least one electro-acoustic transducer for providing an audio output, a processor coupled with the at least one transducer;

an audio input module coupled with the processor for receiving audio input signals; and a battery configured to power the at least one transducer, the processor, and the audio input module;

an input channel for receiving a hard-wired audio input connection; and at least one wireless input channel for receiving an audio input from a source device via a wireless connection, wherein the processor is configured to:

adjust an audio signal received from the hard-wired audio input connection if a source device is already connected via the wireless connection.

2. The portable speaker of claim 1, wherein the processor switches the input channel to an effects loop in response to detecting the hard-wired audio input connection while the source device is already connected via the wireless connection.

3. The portable speaker of claim 2, wherein adjusting the audio signal comprises adjusting a pre-amplification order of the audio signal prior to providing the audio output.

4. The portable speaker of claim 1, wherein the processor is further configured to:

receive the audio input from the source device via the wireless connection as a digital audio input; and convert the digital audio input to an analog audio signal.

5. The portable speaker of claim 1, wherein the hard-wired audio input connection comprises a tip-sleeve (TS) connection.

6. The portable speaker of claim 1, wherein the at least one wireless input channel comprises at least two wireless input channels.

7. The portable speaker of claim 6, further comprising at least two wireless transmitters detachably housed in the enclosure, each wireless transmitter for enabling the wireless connection between the source device and a corresponding one of the wireless input channels.

8. The portable speaker of claim 7, wherein each of the wireless transmitters is configured to connect the source device with the portable speaker in response to detecting a connection with the source device.

9. The portable speaker of claim 7, further comprising a set of docks for housing the wireless transmitters.

10. The portable speaker of claim 9, wherein the processor is configured to:

in response to detecting that at least one of the wireless transmitters is powered on and paired with the portable speaker and detecting the hard-wired input connection, adjusting the audio input signal received from the hard-wired audio input connection to play as an effects loop, wherein the processor is configured to adjust the audio input signal from the hard-wired audio input connection to play as an effects loop only if the wireless transmitter is powered on and paired with the portable loudspeaker.

11. The portable speaker of claim 1, wherein the processor is configured to select the audio input based on a command from an application run on a connected smart device.

12. The portable speaker of claim 1, further comprising a hard-wired power connector for charging the battery and powering the portable speaker.

13. The portable speaker of claim 1, further comprising a set of docks for housing at least two wireless transmitters detachably housed in the enclosure, the set of docks each including a data connector that enables at least one of a software update for a respective one of the wireless transmitters, or a debug accessory mode (DAM) operation at the respective one of the wireless transmitters.

14. The portable speaker of claim 1, wherein the processor is configured to:

in response to detecting the hard-wired audio input connection, determine whether an existing audio input from a source device is detected via the wireless connection, if detecting an existing audio input from the source device via the wireless connection, output audio input from the source device as primary audio, if failing to detect an existing audio input from the source device via the wireless connection, output audio input from another source device connected via the hard-wired audio input connection, check whether a wireless transmitter is present in a corresponding dock in the enclosure prior to determining whether the existing audio input from the source device is detected via the wireless connection, and if the wireless transmitter is present in the corresponding dock in the enclosure, output audio input from another source device connected via the hard-wired audio input connection.

15. The portable speaker of claim 1, wherein adjusting the audio signal received from the hard-wired audio input connection if a source device is already connected via the wireless connection includes outputting one of:

the audio signal received from the hard-wired audio input connection as primary audio, or an audio signal received from the wireless connection as primary audio.

16. A public address (PA) speaker comprising the portable speaker of claim 1.

17. A method of controlling a portable speaker having an input channel for receiving a hard-wired audio input connection and at least one wireless input channel for receiving an audio input from a source device via a wireless connection, the method comprising:

detecting a wireless connection with a first source device via the at least one wireless input channel;

detecting a wired connection with a second source device via the hard-wired audio input connection after detecting the wireless connection with the first source device; and adjusting an audio signal from the second source device if the first source device is already connected via the at least one wireless input channel.

18. The method of claim 17, wherein adjusting the audio signal from the second source device comprises switching the input channel to an effects loop in response to detecting the wired connection with the second source device while the first source device is already connected via the wireless connection.

19. The method of claim 17, wherein adjusting the audio signal comprises adjusting a pre-amplification order of the audio signal prior to providing an audio output at the portable speaker.

20. The method of claim 17, wherein adjusting the audio signal from the second source device includes outputting one of:

the audio signal received from the second source device as primary audio, or an audio signal received from the wireless connection with the first source device as primary audio.

* * * * *